Oct. 2, 1934.  A. McL. NICOLSON  1,975,516
GRAVITY INDICATOR
Filed Aug. 8, 1930
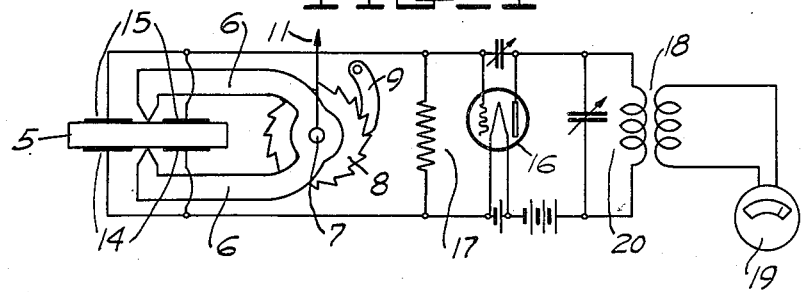
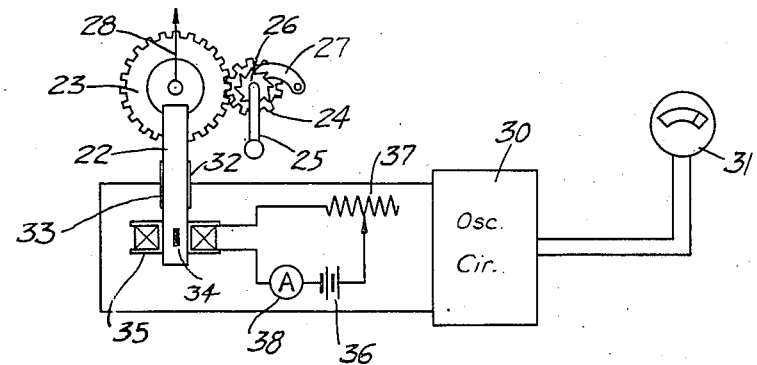
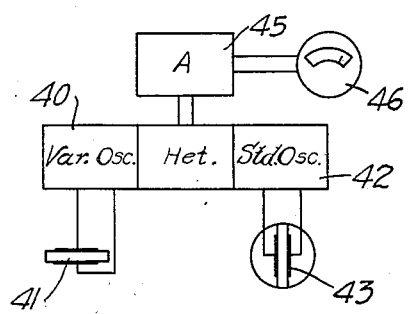
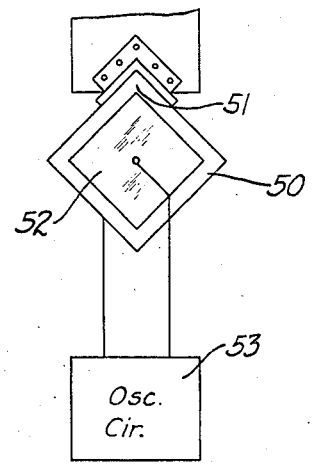
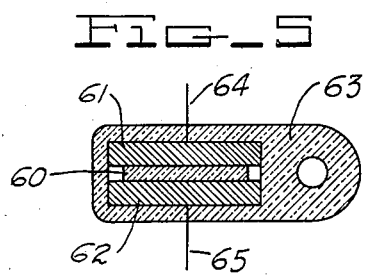
INVENTOR
Alexander McLean Nicolson.
BY
ATTORNEY Patented Oct. 2, 1934

1,975,516

UNITED STATES PATENT OFFICE

1,975,516

GRAVITY INDICATOR

Alexander McLean Nicolson, New York, N. Y., assignor to Communication Patents, Inc., New York, N. Y., a corporation of Delaware Application August 8, 1930, Serial No. 474,030

10 Claims. (Cl. 177—352)

This invention relates to a method of and apparatus for determining the value of gravity at any position upon the earth's surface.

An object of the invention is to determine the value of gravity at any desired location upon the earth's surface.

Another object of the invention is to determine the value of gravity at any location on the earth's surface by a direct reading indicator.

A further object of the invention is to obtain the adjustment of the plane of oscillation of a piezoelectric crystal in an oscillating circuit.

It is understood at the present time that to make an accurate determination of the value of the earth's gravitational force at any particular location on the earth, requires many observations and computations of the data obtained therefrom. This is a tedious and time consuming process, which is eliminated by the employment of a direct reading graviometer in accordance with this invention.

It has been found that the resonant frequency of a crystal in an oscillatory circuit is dependent upon the position of the crystal with respect to the axis of the earth. In other words, a crystal positioned so that its optical axis is coincident with a line from the center of the earth to the position of the crystal has a resonant period different from that at which it will oscillate with its optical axis perpendicular to this line. Intermediate positions of the crystals will vary the resonant period between these two limits, although it has not been determined just what particular law this variation follows. However, there is a distinct discrepancy in the resonant period of the crystal in the two mutually perpendicular positions which varies according to the earth's gravity and which is particularly true when the crystal is artifically weighted. With the crystal oscillating in the neighborhood of 250 kilocycles per second, a variation of 100 cycles has been observed.

Another finding upon which this invention is based is that a crystal's resonant period will not change when its optical axis is coincident with, or axes of oscillation are normal to, the line from the earth's center to the crystal, no matter at what location the observations are taken. In this way a standard oscillating frequency is used for all locations, and as the frequency of the crystal is variable in the right angle position, a definite comparsion can be made. The value of this difference determines the value of "$g$" at various locations.

The present invention contemplates the use of a high frequency oscillating crystal with the usual type of associate circuits and vacuum tubes. In the output circuit of the oscillator is a direct reading indicator which registers the difference in frequency between the horizontal and the vertical position of a crystal. The tuning of the circuits is broad to permit substantially constant efficiency over a definite range of frequencies. The differential may also be obtained by heterodyning a crystal in the horizontal position with one in the vertical position, the beat note determining the difference in frequency between the two oscillating circuits. With the present invention, therefore, all that is required to determine "$g$" is to energize the circuits, adjust the crystal in a vertical position to oscillate at the standard frequency, and then rotate the crystal to a horizontal position and note the change in frequency. By a direct equation in which $g$ is a function of the indicator reading, a calibration of the indicator may be made. With the heterodyne circuit, a direct reading of the beat note, gives the value of "$g$".

By the use of an artificial earth field produced by a solenoid positioned so as to influence the resonant period of the crystal, rotation of the crystal may be eliminated.

The details of the invention will be more fully understood from the following description taken with reference to the accompanying drawing in which:

Figure 1 shows a crystal mounted in accordance with the invention, together with its associate oscillating and indicator circuits;

Fig. 2 shows a different mounting for an auxiliary magnetic field;

Fig. 3 is a diagrammatic view of a heterodyne circuit for measuring gravity;

Fig. 4 shows another crystal mounting; and

Fig. 5 shows a weighted crystal mounting.

Referring specifically to Figure 1, a crystal 5 is shown mounted at a central nodal point with a U bracket 6, the bracket being pivoted on a shaft 7. Also mounted on this shaft is a ratchet wheel 8 with its associate pawl 9 for controlling the position of the U bracket 6, and consequently the crystal 5. The ratchet wheel has mounted thereon a pointer 11 for indicating the position of the crystal, in the event the mechanism shown is enclosed within a housing. Connected to the crystal are electrodes 14 and 15, which may be of the usual type such as tinfoil and the like. These electrodes are connected in the input circuit of a vacuum tube 16, and shunted by the usual grid leak 17. The vacuum tube has a tuned plate circuit 20, and is otherwise the usual type of oscillating circuit. The output of this oscillator is connected through transformer 18 to a wave meter 19 which indicates the frequency at which the circuit is oscillating.

For determining a value of gravity it is only necessary to take a reading on the meter 19 with the crystal in the position shown, then rotate the crystal so that the indicator 11 is in a horizontal position and note the frequency of the circuit. The difference between the two readings will give an indication of the effect of the earth's gravitation on the oscillating crystal at that particular location. The wave meter 19 may be calibrated to read the value of "g" on the inscribable surface thereof, a zero reading check being made by placing the crystal in the neutral or vertical position and noting the frequency.

In Fig. 2 a crystal 22 is shown mounted on a rotatable sprocket wheel 23. This wheel may be rotated by a meshed second gear 24 with a manual control 25, and maintained in position by a ratchet 26 and pawl 27. An indicator 28 is also shown in this mechanism for determining the position of the crystal 22 in case the apparatus is mounted within a protective housing. In this embodiment of the invention the oscillating circuit 30 is shown in block form, but may be identical with the circuit of Fig. 1. Also the wave meter 31 may be the same as meter 19 in Fig. 1. The crystal is connected to an oscillating circuit by the electrodes 32 and 33.

This embodiment differs from the one above described by the addition of a solenoid coil 35 shown in dimensional cross section mounted on the lower portion of the crystal. The winding of this coil is energized from a battery 36, the energization being controlled by a rheostat 37, the amount of energization being indicated by the ammeter 38. Attached to the crystal in any suitable manner or embedded therein is a pellet 34 of soft iron or the like, which is acted upon by the magnetic field of the coil 35. This system may operate in the same manner as that of the system of Fig. 1, that is by rotating the crystal by means of the manual lever 25 and noting its variation in oscillating frequency in the horizontal and vertical positions. However, by means of the auxiliary magnetic field produced by the coil 35, it is unnecessary to vary the position of the crystal to make a measurement of the earth's gravitational force. This is accomplished by calibrating the ammeter 38 for different values of the magnetic field surrounding the crystal by use of the rheostat 37 and the wave meter 31. Upon determining the variations in the oscillations of the crystal due to the field strength of the coil, all that is required is to note the current to the auxiliary field. The amount of current required to restore the oscillatory circuit to a definite basic frequency, the current being read on the ammeter 38 provides an indication of the effect of gravity at the various observation points.

A third embodiment of the invention is shown in Fig. 3, in which an oscillator circuit 40 of the type shown in Fig. 1, but with a fixed crystal 41 mounted in a horizontal position, is employed together with a similar oscillating circuit 42, with a crystal 43 mounted in the vertical position. The first oscillating circuit will vary from point to point on the earth's surface, in accordance with the variation in gravity at various places. These two oscillators may have combined outputs into the input of a vacuum tube, and which will appear as a difference frequency or so-called "beat note". When this beat note is amplified in the amplifier 45 and connected with a frequency meter 46, the difference in frequency between the two oscillators will be read directly. Since one of the oscillators is independent of gravity and the others dependent thereon because of the crystal mountings, a direct reading of the value of gravity may be taken from the meter. In brief, this is a heterodyne method of directly determining gravity.

In Fig. 4 a particular type of crystal mounting is illustrated in which a crystal 50 is mounted from one corner 51. In mounting the crystal in this manner the crystal has more freedom of oscillation than when mounted from the side, such as shown in Fig. 2, and tends to provide a more efficient circuit. An electrode 52 and its opposing electrode (not shown) are connected to the usual oscillating circuit 53 which may be similar to that shown in Fig. 1.

It has been found in experimentation with crystals mounted in different orientations with respect to a plane through the earth's center, that when a crystal is weighted by electrodes of considerable mass, a larger differential in the resonant frequencies is obtained. To utilize this discovery, a mounting such as shown in Fig. 5 may be used in a circuit of the preceding systems. A crystal 60 is mounted between two metallic electrodes 61 and 62 which may be composed of metallic conducting materials having considerable mass and weight. The crystals and electrodes are embedded firmly within an insulating medium 63, such as bakelite, hard rubber or the like, from which connections are made by the conductors 64 and 65. This crystal mounting may be attached to a shaft which will rotate the apparatus as a unit. The weight of the electrode 61 will have an effect upon the resonant period of the crystal when the crystal is mounted in a horizontal position, while in the vertical position the effect of the weight of the electrode will be eliminated. Apparatus of this type will lend itself to the more accurate determination of the value "g" since it will cause a larger discrepancy between the oscillations of the crystal in the two normal positions.

There are many other crystal oscillating circuits in which the principle of the invention may be employed, and all the equivalents of the present invention are intended to be within the scope of the appended claims.

What is claimed is:

1. Apparatus for determining the value of gravity comprising an oscillating circuit, and means for adjusting a frequency determining element of said circuit to oscillate in different orientations with respect to the earth's surface, said element being a piezoelectric crystal.

2. Apparatus for determining the value of gravity comprising a piezoelectric crystal, associate-circuits therefor in which oscillations may be generated by said crystal, an indicator for indicating said frequencies generated, and means for orienting said crystal with respect to the earth's gravitational field.

3. Apparatus for the determining of gravity comprising a piezoelectric crystal, associate circuits in which said crystal generates electrical oscillations, indicating means for determining the frequency at which said system is oscillating, and means for shifting said crystal in the earth's gravitational field, said indicating means being calibrated to indicate the variation in frequency of said crystal.

4. In combination, a piezoelectric crystal oscillator, a second piezoelectric crystal oscillator, said crystals of said oscillators being mounted in different planes with respect to a plane passing through the center of the earth, and means for measuring the difference in frequency at which said crystals oscillate.

5. In combination, a piezoelectric crystal oscillator having the crystal thereof mounted in a certain plane, a second crystal oscillator identical with said first oscillator having the crystal thereof mounted in a plane normal to the plane of said first crystal, and means for determining the difference in frequency at which said crystals oscillate.

6. In combination, a piezoelectric crystal oscillator having the crystal thereof mounted in a certain plane, a second crystal oscillator identical with said first oscillator having the crystal thereof mounted in a plane normal to the plane of said first crystal, common output means for said oscillators, and means for indicating the difference in frequency between the oscillations of said crystals, said indicating means being calibrated in gravitational units.

7. The method of determining the value of gravity comprising the determination of the difference in oscillating frequency between a piezoelectric crystal mounted in a plane perpendicular to a plane passing through the center of the earth and said crystal, and said crystal when mounted in a plane at an angle to said first plane, said frequency difference being an indication of gravity according to a predetermined calibration.

8. The method of determining the value of gravity at different locations on the earth's surface comprising first, determining the resonant period of a piezoelectric crystal when positioned in a plane perpendicular to a plane passing through the center of the earth and said crystal, and second, determining the resonant period of said crystal when positioned in a plane normal to said first plane, and noting the difference in frequency between said oscillations, said frequency difference being an indication of gravity according to a predetermined calibration.

9. Apparatus for determining the value of gravity at any point comprising an oscillating circuit, a piezoelectric crystal located in said circuit for determining the frequency thereof, and means for adjusting said crystal in different planes with respect to a plane passing through the center of the earth, the difference in frequency of oscillations at said different positions indicating the value of gravity at said point.

10. In combination, a piezoelectric crystal, an oscillating circuit in which said crystal is connected, means for mounting said crystal with respect to a plane passing through the center of the earth, electromagnetic means for effecting the frequency of oscillation of said crystal, and means for measuring the frequency of said crystal at different values of said magnetic field.

ALEXANDER McLEAN NICOLSON.